Patented Dec. 17, 1968

3,417,071
BLEACHING AND STABILIZING ROSIN COMPOUNDS WITH 1,3,4-THIADIAZOLE POLYSULFIDES
Charles Glenn Wheelus, Panama City, Fla., assignor, by mesne assignments, to Arizona Chemical Company, New York, N.Y., a corporation of Delaware
No Drawing. Filed Dec. 30, 1966, Ser. No. 605,959
6 Claims. (Cl. 260—108)

ABSTRACT OF THE DISCLOSURE

Method of bleaching and stabilizing tall oil rosin and derivatives by heating in the presence of a 1,3,4-thiadiazole polysulfide, typically 2,5-bis(tert.-octyldithio)-1,3,4-thiadiazole.

---

This invention relates to rosin compounds of improved color and color stability and to methods of treating rosin compounds to provide these advantages.

Rosin compounds are widely employed in the manufacture of paper size, as plasticizers for films such as polyethylene and polypropylene, and for the manufacture of resins used in paint and varnish. In these and other end uses the industry desires a light colored product which also exhibits color stability. These properties are sought in the rosin compounds used to make these products since good color and stability are normally retained in the end product.

It is known that rosin compounds may be bleached somewhat by heating at elevated temperatures or by treatment with sulfur, sulfur dioxide and similar substances. However, the degree of bleaching often is poor and the treated compounds do not exhibit good color stability. Furthermore, substantial amounts of the treating agent, e.g., sulfur, are often required, thus adding to the expense of treatment. Distillation and crystallization are also employed to achieve bleaching but these methods require elaborate apparatus and extended processing time and thus substantially increase the expense of the treated products. Other problems encountered in prior art bleaching methods include retention of the odor of the treating agent in the rosin compounds (particularly objectionable if sulfur) and tendency to form unsaponifiable materials during the treatment.

An object of the present invention is to provide light colored rosin compounds which also exhibit color stability.

A further object is to provide a method of bleaching and stabilizing rosin compounds without substantial effect on other properties of the compounds, particularly formation of unsaponifiable materials.

A still further object is to provide a method of bleaching and stabilizing rosin compounds which is relatively inexpensive by virtue of simplicity of treatment and the use of only catalytic amounts of a treating agent.

These and other objects, features, and advantages of the invention will become more apparent from the description which follows.

Accordingly, the color of rosin compounds may be improved, i.e., lightened and stabilized, by treatment at somewhat elevated temperatures with a catalytic amount of a 1,3,4-thiadiazole polysulfide of the formula:

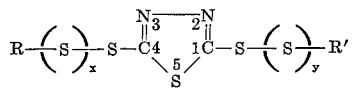

wherein R and R' are hydrocarbon groups, x and y are numbers from 0 to about 8, and the sum of x and y is at least 1. Groups R and R' can be identical or different and can contain from 1 to about 30 carbon atoms, preferably 4 to about 16 carbon atoms, and can be aliphatic or aromatic, including acyclic, alicyclic, aryl, aralkyl and alkaryl groups. Typical hydrocarbon groups are ethyl, propyl, butyl, hexyl, octyl, nonyl, decyl, dodecyl, tridecyl, hexadecyl, octadecyl, cyclopentyl, cyclohexyl, cycloheptyl, phenyl, tolyl, benzyl, naphthyl, styryl, and the like.

The term "treating agent" or "treating compound," or like term, is intended herein to mean compounds defined by Formula I above. These compounds are known materials as disclosed in U.S. Patent 2,719,126, which patent is incorporated herein by reference. Illustrative of the compounds are those wherein the sum of $x$ and $y$ is 1–4 and R and R' are each n-dodecyl, tert.-dodecyl, tert.-octyl, 5-α-methyl, styryl, or the like, such as described in said patent.

By "rosin compounds" is meant abietyl compounds, i.e., hydrophenanthrene radical-containing materials, including but not limited to the following: tall oil rosin, tall oil fractions predominating in rosin acids, i.e., containing at least about 50% by weight of rosin acids; wood rosin; and gum rosin; modifications of these products such as hydrogenated rosins, formaldehyde-treated rosins (such as described in U.S. Patents 2,934,468 and 3,132,127), Diels-Alder reaction products such as fumarated rosins and maleated rosins; derivatives of such rosins including rosin esters, rosin amines, rosin amides, rosin alcohols, rosin-alkylene adducts; and the numerous well-known equivalents of the foregoing materials. The term "rosinyl," as defined in U.S. Patent 2,154,629, is a convenient representation for the "rosin compounds" of the present invention.

Rosin esters include reaction products of rosin and mono- and polyhydroxy alcohols such as methanol, ethanol, butanol, ethylene glycol, pentaerythritol, glycerol, and the like. Among the many well-known rosin amines may be mentioned the products prepared by dehydrating the ammonium salt of rosin to the nitrile which is then reduced by hydrogen to the amine. Rosin amides are conventionally prepared either by decomposing ammonium salts of rosin or by reacting rosin with primary amines. Rosin alcohols are conventionally prepared by reduction of the corresponding rosin esters. Rosin-alkylene oxide adducts include the known reaction products of rosin and ethylene oxide and the like.

The rosin compounds are bleached and stabilized by treatment with minor amounts of a treating compound of Formula I at elevated temperatures for a time sufficient to effect bleaching. Very small amounts of the additive are effective and may be termed "catalytic amounts," e.g., from about 0.01% to 1.0%, preferably 0.02% to 0.5%, by weight of the treating compound based on the weight of the rosin compound.

The range of temperature and time of treatment will vary depending on the type of rosin, modified rosin or rosin derivative employed. Little or no bleaching is observed in the absence of heating or if the rosin compounds are heated in the absence of the treating compound. Normally, the rosin compound is heated in the presence of the treating compound at a temperature in the range of from about 180° C. to 350° C. for up to about 18 hours, the longer times corresponding to the lower temperatures and vice versa. The higher temperatures generally promote lighter colors when the treating compound concentration is held constant but excessive temperatures should be avoided since degradation and excessive formation of unsaponifiable materials may result therefrom. Optimum bleaching and color stability is obtained for most of the rosin compounds when the same are treated with about 0.1% to 0.5% of the treating agent at 240° C. to 275° C. for about 30 minutes to one hour.

To avoid oxidation, the treatment is generally conducted under a blanket of inert gas such as nitrogen, carbon dioxide, steam and the like.

The bleaching and color stabilizing effect of the invention is a surprising result since it would not be expected that the compounds of Formula I, many of which are known antioxidants, would bleach rosin compounds as well as stabilize the resulting lighter colored products against degradation and coloration. While the reasons for this behavior are not fully understood, it is believed that the bleaching occurs by the transformation of color bodies in the rosin compounds.

The following example further illustrates the invention but is not limitative thereof except as indicated in the appended claims. All parts and percentages are by weight unless otherwise specified.

EXAMPLE

The process of the invention is conducted generally by charging a rosin compound to a suitable reaction vessel equipped with thermometer, inert gas inlet and means for agitation. When steam is employed as the inert gas, a suitable condenser is attached. The treating agent is then added to the vessel and heat is applied. The contents are reacted under an inert gas blanket, such as nitrogen or steam, while maintaining the temperature at a preselected level. Colors are determined following this treatment. Samples are then tested for color stability after aeration. The samples are aerated by drawing over them for 10 minutes a volume of air equal to 2 milliliters of air per gram of rosin compound which has been heated to 180–200° C. under agitation. The vessel containing the treated rosin compound is then closed and agitation continued for 20 minutes at 180° C. to 200° C. Aeration and color sampling is repeated as required.

In a typical experiment conducted substantially as described, a sample of tall oil rosin is heated at 275° C. for 1 hour under nitrogen with 0.2% by weight of "Amoco 150," a commercially available compound of the structure of Formula I hereinabove where $x$ and $y$ are each believed to be 1 and R and R' are each believed to be tertiary octyl groups. A sample of the rosin heated as described but in the absence of the 1,3,4-thiadiazole compound had Y color. The sample treated with the 1,3,4-thiadiazole compound, as described, had 5A color, representing four color grades lighter than a color of Y. When aerated once, the treated rosin sample darkened to 3A color. After aeration a second time, the color darkened to 2A and after a third aeration, to X (one grade darker than Y). The color values are on the conventional French scale. Effective bleaching and stabilization of the resulting lighter color are thus demonstrated by these results.

I claim:

1. A method of bleaching and stabilizing rosin compounds which comprises heating said compounds at from about 180° C. to 350° C. in the presence of from about 0.01% to 1.0% by weight of a 1,3,4-thiadiazole polysulfide compound of the formula

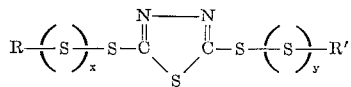

wherein R and R' are hydrocarbon groups, $x$ and $y$ are numbers from 0 to about 8, and the sum of $x$ and $y$ is at least 1.

2. The method of claim 1 wherein, in said 1,3,4-thiadiazole polysulfide compound, at least one of R and R' is aliphatic.

3. The method of claim 1 wherein, in said 1,3,4-thiadiazole polysulfide compound, R and R' contain 4 to about 16 carbon atoms and the sum of $x$ and $y$ is 1 to 4.

4. The product of the method of claim 1.
5. The product of the method of claim 2.
6. The product of the method of claim 3.

References Cited

UNITED STATES PATENTS

| | | | |
|---|---|---|---|
| 1,990,367 | 2/1935 | Borglin | 260—108 |
| 2,471,714 | 5/1949 | Barthel et al. | 106—218 |
| 2,719,126 | 9/1955 | Fields et al. | 252—47 |
| 2,791,577 | 5/1957 | Outterson et al. | 260—97.7 |
| 3,377,333 | 4/1968 | Ciesielski et al. | 260—97.6 |
| 3,377,334 | 4/1968 | McBride et al. | 260—98 |

DONALD E. CZAJA, *Primary Examiner.*

R. A. WHITE, *Assistant Examiner.*

U.S. Cl. X.R.

260—97.7, 98, 107